United States Patent [19]
Kurasawa et al.

[11] Patent Number: 5,366,939
[45] Date of Patent: Nov. 22, 1994

[54] GRADIENT INDEX OPTICAL ELEMENT

[75] Inventors: Yuko Kurasawa, Hachiohji; Satoshi Noda, Akishima; Morinao Fukuoka, Hachiohji, all of Japan

[73] Assignee: Olympus Optical Company Limited, Japan

[21] Appl. No.: 954,319

[22] Filed: Sep. 30, 1992

[30] Foreign Application Priority Data

Sep. 30, 1991 [JP] Japan ................................. 3-278347

[51] Int. Cl.$^5$ ............................................ C03C 3/076
[52] U.S. Cl. ........................................ 501/55; 501/53; 501/60; 501/63; 501/64; 501/69; 501/70; 501/72
[58] Field of Search ................ 501/55, 60, 63, 64, 501/69, 70, 72, 53

[56] References Cited

U.S. PATENT DOCUMENTS

| | | | |
|---|---|---|---|
| 3,938,974 | 2/1976 | Macedo et al. | 501/55 |
| 4,336,048 | 6/1982 | van der Steen et al. | 501/54 |
| 4,345,036 | 8/1982 | Bamford et al. | 501/54 |
| 4,439,008 | 3/1984 | Joormann et al. | 501/55 |
| 4,495,298 | 1/1985 | Yamagishi et al. | 501/55 |
| 4,797,376 | 1/1989 | Caldwell et al. | 501/54 |
| 4,902,650 | 2/1990 | Caldwell et al. | 501/55 |
| 5,068,208 | 11/1991 | Haun et al. | 501/54 |
| 5,182,236 | 1/1993 | Caldwell et al. | 501/55 |

OTHER PUBLICATIONS

Kita et al., "Light-Focusing Glass Fibers and Rods", Journal of the American Ceramic Society, vol. 54, No. 7, Jul. 1971, pp. 321–326.
Ohmi et al., "Gradient-Index Rod Lens Made By A Double Ion-Exchange Process", Applied Optics, vol. 27, No. 3, Feb. 1, 1988, pp. 496–499.
Yamane et al., "Gradient-Index Glass Rods of $PbO-K_2O-B_2O_3-SiO_2$ System", Journal of Non-Crystalline Solids, vol. 100 (1988) pp. 506–510 no month.
Shingyouchi et al., "Radial Gradient Refractive-Index Glass Rods Prepared By Sol-Gel Method", Electronics Letters, vol. 22, No. 2, Jan. 16, 1986, pp. 99–100.
Shingyouchi et al., "r-Grin $TiO_2-SiO_2$ Glass Rods Prepared By A Sol-Gel Method", Electronics Letters, vol. 22, No. 21, Oct. 9, 1986, pp. 1108–1110.

Primary Examiner—Anthony Green
Attorney, Agent, or Firm—Bruce L. Adams; Van C. Wilks

[57] ABSTRACT

A gradient index optical element for use in optical lens such as a camera or microscope is disclosed. The optical element comprises at least one of first metal dopants selected from La, Zr, Sn, In, Y, Ge, Zn, Ba, Ca, As, Sr, Ga and Gd distributed in solvent with a slope, and at least one of second metal dopants selected from Nb, Ta, Ti, Bi, Pb, Sb, Zr, Sn, In, Y and Tl, which is distributed equally in the solvent so as to satisfy following equation as absolute amount;

$$|\Delta C_f / \Delta C_g| \cdot 100 \leq 5$$

wherein $\Delta C_g$ is a difference between maximum value and minimum value of equivalent value of metal oxides of the first metal doping and $\Delta C_f$ is a difference between maximum value and minimum value of equivalent value of metal oxides of the second metal doping.

37 Claims, 3 Drawing Sheets

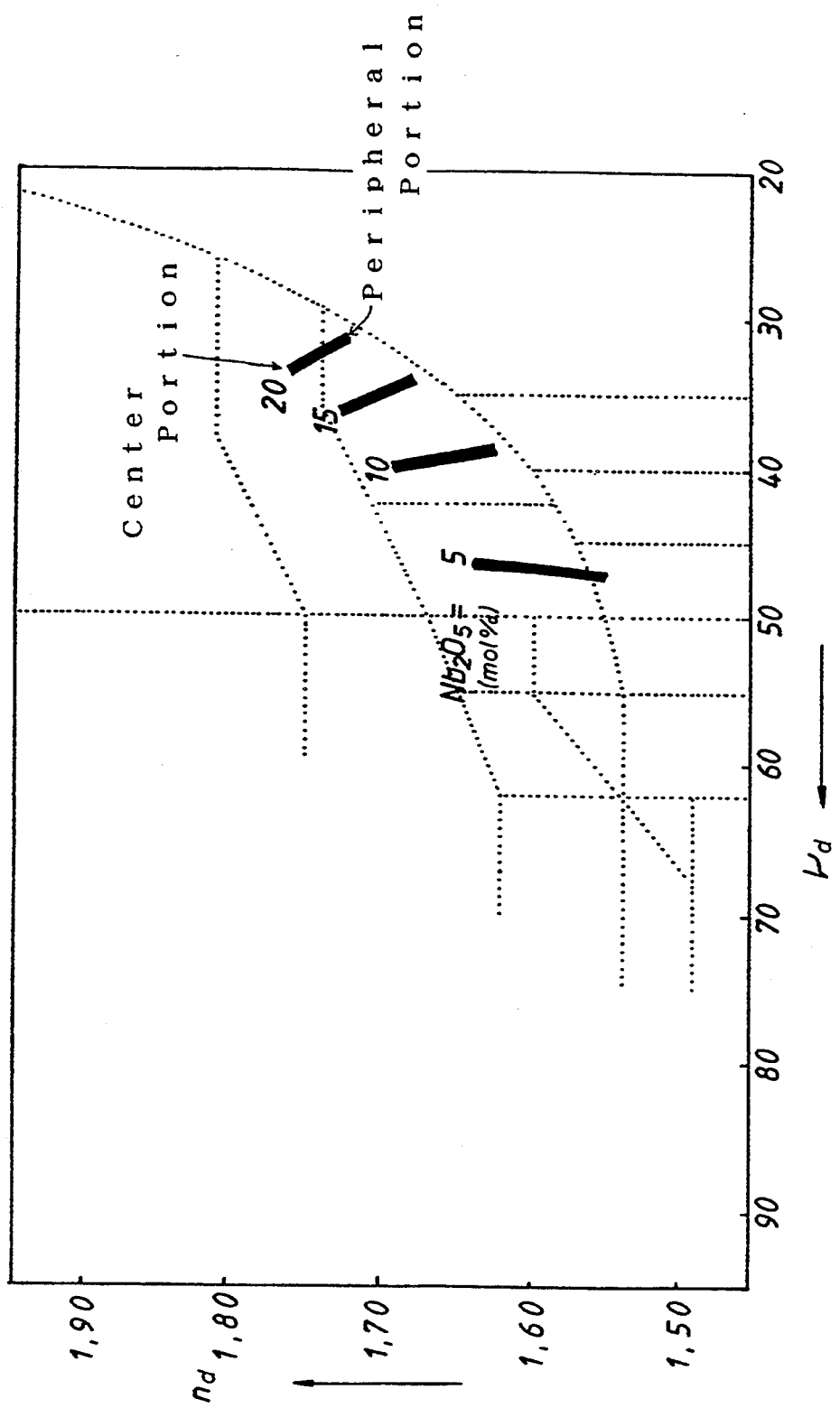

GRADIENT INDEX OPTICAL ELEMENT

BACKGROUND OF THE INVENTION

The present invention relates to a gradient index optical element applicable to an optical lens such as a camera, a microscope or the like.

Such a gradient index optical element has a power (refractive power) in its medium by imparting a distribution of a refractive index to the medium. This power is determined by the refractive index distribution, so that in order to make the power large, the absolute value $|\Delta n|$ of a difference $\Delta n$ in the refractive index n must be made large. Heretofore, many attempts of making the absolute value $|\Delta n|$ large have been done by many searchers. For example, an optical element which is commercially available under the name of SELFOC lens (Trade name) has a large absolute value $|\Delta n|$ by imparting a concentration gradient of Tl to the medium by ion exchange. Also, a lens of $|\Delta n| \approx 0.059$ was obtained by imparting a concentration gradient of Ag to the medium by a double ion exchange method (Applied Optics, vol. 27, no. 3 (1988) p.496). Moreover, a lens of $|\Delta n| \approx 0.04$ was obtained by imparting a concentration gradient of Pb and K to the medium by the sol-gel method (J.Non-cry.sol.100, 506, 1988). Finally, a lens of $|\Delta n| \approx 0.03$ was obtained by imparting a concentration gradient of Ti or Ge to the medium by the sol-gel method (Elect.Lett.22, 99 (1986), Elect.Lett.22, 1108 (1986)).

However, the developments in the gradient index optical element up to the present have mainly involved an approach resulting in increasing the absolute value $|\Delta n|$, but measures to decrease the chromatic aberration possessed by the optical elements themselves have lagged behind. In designing optical elements, it is possible to drastically decrease the number of lenses constructing the optical system for a lens system of a camera by using the excellent aberration correction ability of the gradient index optical element, but there is an inconsistency that the chromatic aberration correction of the lens system becomes more difficult as the number of the lenses decreases. In order make a lens system in which the number of lenses is small and the chromatic aberration is corrected, it is important to decrease the chromatic aberration itself generated in each lens. Therefore, the following properties are desired for the medium of a gradient refractive index optical element.

In a radial gradient refractive index optical element, the refractive index of the medium differs depending on the position through which a light beam is passing (the distance from the axis), and also the refractive index of the light beam differs. The Abbe number $v_d$ of the medium may be designated by $v_d = (n_d - 1)/(n_F - n_C)$. If this Abbe number $v_d$ is constant from the above equation, the dispersion $(n_F - n_C)$ increases as the refractive index $n_d$ increases. Therefore, in order to prevent the chromatic aberration from increasing for an increase of refractive index, it is necessary to increase the Abbe number $v_d$ as the refractive index $n_d$ is increased (refer to Japanese Patent Laid-Open No. 141,302/91). That is, it is desirable to obtain an optical element having a gradient of concentration distribution in the direction A on the $n_d - v_d$ graph shown in FIG. 5.

The gradient index optical element is then obtained by imparting a gradient of refractive index to the medium on the basis of a gradient of concentration of metal oxide in a glass. The optical property of the glass is determined by its oxide composition. For glass having as its principal component $SiO_2$, metal oxides except for Si have a high refractive index as compared with $SiO_2$ glass, and dispersion becomes large (that is, the Abbe number becomes small), so that if a gradient index optical element is obtained by imparting a concentration gradient to these metal dopants, only the gradient index optical element having a gradient of concentration distribution in the direction B on the $n_d - v_d$ graph shown in FIG. 5 is obtained.

Japanese Patent Laid-Open No. 141,302/91 discloses a gradient index optical element obtained by imparting concentration distributions in opposite directions to each other to the medium with the use of two or more metals, in which the concentration distribution property may be variously changed. However, it is difficult to obtain the gradient index optical element, since the above method of imparting concentration distributions of two metals in opposite directions to each other is limited. That is, heretofore, it is difficult to obtain the optical element having optical properties in the direction A on the $n_d - v_d$ graph shown in FIG. 5 and desired in the designing of optical devices at the point of material production.

SUMMARY OF THE INVENTION

It is an object of the present invention to overcome the above described disadvantages of the conventional gradient index optical elements.

It is another object of the present invention to provide a gradient index optical element in which chromatic aberration correction is excellent, that is, the Abbe number becomes large as the refractive index becomes large, or the change in Abbe number is small with any increase of refractive index.

According to the present invention, there is provided a gradient index optical element comprising at least one of first metal dopants selected from a metal group G {La, Zr, Sn, In, Y, Ge, Zn, Ba, Ca, As, Sr, Ga and Gd} distributed in a medium with a slope, and at least one second metal dopant selected from a metal group F {Nb, Ta, Ti, Bi, Pb, Sb, Zr, Sn, In, Y and Tl}, which is distributed equally in the medium so as to satisfy the following equation as an absolute amount;

$$|\Delta C_f / \Delta C_g| \cdot 100 \leq 5$$

wherein $\Delta C_g$ is a difference between the maximum value and the minimum value of the absolute amount of metal oxides of the first metal doping and $\Delta C_f$ is difference between the maximum value and the minimum value of the absolute amount of metal oxides of the second metal doping.

It has been found that the gradient index optical element constructed according to the present invention is excellent in performing chromatic aberration correction. That is, in the radial gradient index optical element, as shown in FIG. 1, it is found that a low occurrence of chromatic aberration can be obtained when the concentration distribution of first metal dopant g has its largest absolute value at the center portion of the optical element and decreases parabolically to the periphery portion and when the concentration distribution of second metal dopant f has a substantially even absolute value. When, as shown in FIG. 2, the concentration distribution of the first metal dopant g is made in the reverse direction, it is recognized that the same effect as described above can be obtained.

These effects are exhibited only when the metal dopant f is contained in the optical element, and thus, even when the concentration distribution of the metal selected from the above metal group G is obtained with a certain gradient as the first metal dopant g, if the second metal dopant f selected from the above metal group F is not included, the optical element with the desired optical properties cannot be obtained.

According to the present invention, the second metal dopant can be made distributed substantially even as an absolute amount, so that the difficulty in production that the concentrations of two kinds of metal dopants are distributed in the reverse directions to each other can be avoided and thus the gradient index optical element having a low occurrence of chromatic aberration can be produced relatively easily.

In selecting metals from metal groups G and F with high effect, particularly, when the optical element has a metal dopant selected from metal group G"{Zr, Sn, In, Y, Ge, Zn, Ga} as the first metal dopant g, the second metal dopant f must be selected from metal group F"{Nb, Ta, Bi, Pb, Sb, Zr, Tl}. Also, when the optical element has at least one metal dopant selected from metal group G'{La, Ba, Ca, As, Sr, Gd} as the first metal dopant g, the second metal dopant f must be selected from metal group F'{Nb, Ta, Ti, Bi, Pb, Sb, Zr, Sn, In, Y, Tl}. Moreover, two or more kinds of metals may be selected from respective metal groups, and a combination thereof may be used.

BRIEF DESCRIPTION OF THE DRAWINGS

FIG. 3 is an explanatory view showing a relationship between the Abbe number and the refractive index of a gradient index optical element shown in example 19;

DESCRIPTION OF THE PREFERRED EMBODIMENT

Figure 1:
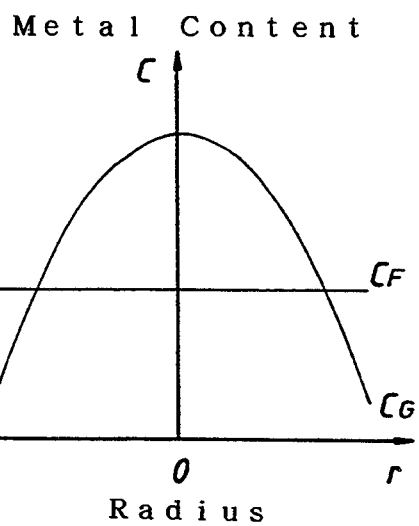
FIG. 1 is a conception view showing a metal content distribution of a gradient index optical element according to the present invention.
Figure 2:
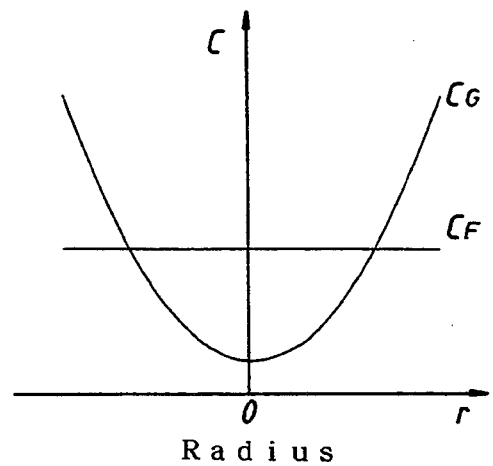
FIG. 2 is a conception view showing a metal content distribution of a gradient index optical element according to another embodiment of the present invention.
Figure 5:
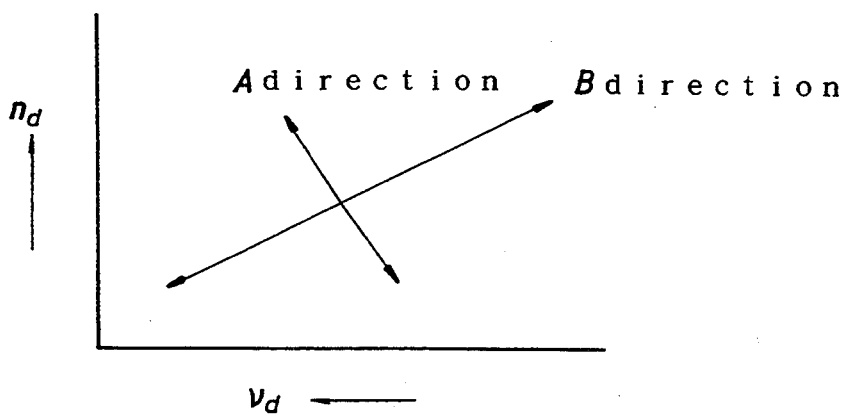
FIG. 5 is an explanatory view showing a preferable and non-preferable relationship between Abbe number and refractive index of a gradient index optical element.

It is found that the gradient index optical element capable of optionally changing the amount of chromatic aberration can be obtained by variously changing the method of selecting metal dopants and the amount of respective metal dopants. For example, assuming that metal dopants g, f are selected and the maximum amount $C_g$ of first metal dopant g is made constant, the gradient of the optical properties shown in FIG. 5 is liable to slant to the left direction by increasing the content of the second metal dopant f having an even concentration distribution. That is, in FIG. 5, the optical element is liable to exhibit the optical properties in the direction of A. Contrarily, if the amount of second metal dopants f is low, the optical element exhibits the optical properties in the direction of B in FIG. 5. Therefore, in order to obtain the optical element with the desired optical properties, then at least a minimum amount of second metal dopant f must be contained in the optical element.

The most suitable content of respective metals is different for the contained metal dopant and the aimed optical properties individually, so that it is difficult to determine the most suitable content easily, but it is desired to have an overall conversion amount $C_g$ of metal oxide of the first metal dopants g of 5–40 mol % and an overall conversion amount $C_f$ of metal oxide of the second metal dopant f of 2–40 mol % when the absolute amount of the first metal dopant g is maximum.

The lower content limit of the second metal dopant f is dependent upon its kind, its content and the concentration distribution gradient of metal dopants g, f, as described above, so that it is difficult to determine the lower limit of content of metal dopant f easily, but it is desired to make the lower content limit of every kind of metal dopant f according to the value shown in following Table 1.

TABLE 1

| Effective relationship between metal dopant and its content | |
|---|---|
| Metal dopant f | Effective content of metal dopant f |
| Nb, Ta, Ti, Bi, Sb, Tl | 2≦ |
| Pb, Zr | 5≦ |
| Sn, In, Y | 10≦ |

(Content is a metal oxide conversion ratio mol % of metal dopant f when the absolute amount of metal dopant g becomes maximum).

The lower content limit of desirable metal dopant f is changed even by a combination of both metal dopants g and f. The effective relationship between the selected metal dopants from respective metal groups shown by G and F, that is, a combination of these metal dopants, and the content of metal dopants f at this time, is shown in the following Table 2.

TABLE 2

| Effective relationship of a combination of metal dopants g and f and the content of metal dopant f | | |
|---|---|---|
| Metal dopant f | Metal dopant g | Effective content of metal dopant f |
| Nb, Ta, Ti, Bi, Sb, Tl | La, Ba, Ca, As, Sr, Gd | 2≦ |
| Bi | Y, Ge | |
| Tl | Sn, In, Y, Ge, Zn, Ga | |
| Nb, Ta, Ti, Sb | In, Y, Ge, Ga | 5≦ |
| Pb | La, Y, Ba, Ca, As, Sr, Gd | |
| Bi | Sn, In, Zn, Ga | |
| Tl | Zr | |
| Zr | Ba, Gd | |
| Nb, Ti, Sb | Sn, Zn | 10≦ |
| Bi | Zr | |
| Pb | In, Ge, Zn, Ga | |
| Zr | Ca, As, Sr | |
| Sn | Sr, Gd | |
| In, Y | Ba, Sr, As, Gd | |
| Nb, Sb, Ti | Zr | 15≦ |
| Zr, In | La | |
| Sn | La, Ba, Ca, As | |
| Ta, Pb | Sn | |

(Content is a metal oxide conversion ratio mol % of metal dopant f when the absolute amount of metal dopant g becomes maximum).

In the above Table 2, when a few kinds of metal dopants are selected, the contents of metal oxides are summed up in the metal group to obtain the content of metal dopant f and then to apply to the effective content value of Table 2. Moreover, when a few metals in different columns are selected simultaneously, the effective content value corresponding to the set of metal dopants located in the more upper column is applied as the desirable lower limit of content of metal dopant f.

EXAMPLE 1

In this example, the content of $La_2O_3$ is distributed to decrease radially from the center portion to the periphery portion of the medium in such a manner that the composition of the metal oxide is at the center portion of the medium $TiO_2$ 15 mol %, $La_2O_3$ 15 mol, $SiO_2$ 70 mol %, and at the periphery portion of the medium $La_2O_3$ 0 mol %, so that a radial gradient index optical element having an even concentration distribution is obtained without decrease in the absolute amount of $TiO_2$ at the periphery portion of the medium.

The refractive index distribution of a gradient index optical element according to this example was measured and the following properties were obtained: $n_d = 1.728$, $v_d = 36.6$ at the center portion of the medium, and $n_d = 1.626$, $v_d = 33.5$ at the periphery portion of the medium. It is found from the above measured properties that the optical element according to the present example has an optical property in the direction of A shown in FIG. 5 such that $\Delta n_d = -0.092$, $\Delta v_d = -3.1$ ($\Delta v_d$ is the value of $v_d$ at the periphery portion of the medium minus $v_d$ at the center portion of the medium). The gradient index optical element according to the present example can be used as a very useful radial refractive index distribution due to excellent chromatic aberration correction.

EXAMPLES 2-14

These examples obtain a gradient index optical element in which one of the metal dopants is selected from each of metal group G and metal group F, respectively, and the center portion of the medium contains a composition of oxide conversion ratio mol % described in Table 3 which shows a relationship between the composition of metal oxide and optical property, resulting in a concentration distribution of the first metal dopants of metal group G being decreased or increased in the radial shape to the periphery portion of the medium, and thus the concentration of the second metal dopant of metal group F is evenly distributed as an absolute amount. In Table 3, the minus sign of $\Delta n_d$ in the optical property column denotes a convex shaped distribution in which the refractive index of these optical elements is high at the center portion thereof, and the plus sign of $\Delta n_d$ in the optical property column denotes a concave shaped distribution in which the refractive index of these optical elements is low at the center portion thereof. The plus sign of the product of $\Delta n_d$ and $\Delta v_d$ designates that the optical properties of thus obtained glass shows optical properties in the A direction of FIG. 5 and thus it is found that these optical elements are excellent in reducing the amount of chromatic aberration occurrence.

TABLE 3

| | Composition of metal oxide and optical properties | | | | |
|---|---|---|---|---|---|
| | G | | F | | Property |
| | Metal | Content | Metal | Content | $\Delta n_d$ | $\Delta v_d$ |
| Example 2 | Ge | 20 | Ti | 10 | −0.046 | −0.8 |
| Example 3 | Sr | 20 | Ti | 10 | −0.052 | −2.1 |
| Example 4 | Y | 25 | Ta | 15 | −0.067 | −1.7 |
| Example 5 | Ba | 15 | Zr | 20 | −0.046 | −1.0 |
| Example 6 | Ba | 15 | Pb | 15 | −0.057 | −2.7 |
| Example 7 | La | 15 | Nb | 10 | +0.081 | +1.7 |
| Example 8 | As | 15 | Bi | 5 | −0.084 | −2.0 |
| Example 9 | In | 15 | Sb | 13 | −0.083 | −0.1 |

TABLE 3-continued

| | Composition of metal oxide and optical properties | | | | |
|---|---|---|---|---|---|
| | G | | F | | Property |
| | Metal | Content | Metal | Content | $\Delta n_d$ | $\Delta v_d$ |
| Example 10 | Ga | 10 | Ti | 5 | −0.064 | −0.8 |
| Example 11 | Ca | 20 | Ti | 10 | −0.045 | −1.0 |
| Example 12 | Ba | 15 | In | 18 | +0.039 | +0.1 |
| Example 13 | La | 20 | Sn | 35 | −0.090 | −0.1 |
| Example 14 | Sn | 10 | Nb | 20 | −0.025 | −0.3 |

(Content is a metal oxide conversion ratio mol % of metal dopant f when the absolute amount of metal dopant g becomes maximum)

EXAMPLES 15-18

The above examples 1-14 show the case that only one kind of metal dopant is selected from each metal group G and F, respectively, but two or more kinds of metal dopants may be selected from each respective metal group.

Examples 15-18 obtain a radial gradient index optical element in which, as shown in Table 4 which shows a relationship between the composition of metal oxide and the optical properties, one or more kinds of first metal dopant having a convex shaped concentration distribution are selected from metal group G and metal group F, respectively, and the center portion of the medium contains a composition of oxide conversion ratio described in Table 4 resulting in a concentration distribution of the first metal dopants of metal group G being decreased in radial shape to the periphery portion of the medium, and thus the concentration of second metal dopants of metal group F is evenly distributed as an absolute amount.

TABLE 4

| | Composition of metal oxide and optical properties | | | | |
|---|---|---|---|---|---|
| | G | | F | | Property |
| | Metal | Content | Metal | Content | $\Delta n_d$ | $\Delta v_d$ |
| Example 15 | Be | 20 | Pb | 15 | −0.053 | −1.5 |
| | Ge | 5 | | | | |
| Example 16 | La | 13 | Nb | 7.5 | −0.068 | −2.5 |
| | | | Ti | 7.5 | | |
| Example 17 | Zr | 15 | Nb | 10 | −0.035 | 0.0 |
| | | | Ti | 10 | | |
| Example 18 | La | 10 | Ta | 7.5 | −0.060 | −2.1 |
| | Ge | 10 | Ti | 7.5 | | |

(Content is a metal oxide conversion ratio mol % of metal dopant f when the absolute amount of metal dopant g becomes maximum)

EXAMPLE 19

It has been found that the optical properties of the gradient index optical element in which the composition $(90-x)SiO_2$—$xNb_2O_5$—$0La_2O_3$ of the periphery portion of the medium is changed in accordance with the change of ratio x $Nb_2O_5$ evenly present in the glass as an absolute amount, by eluting only $La_2O_3$ from the medium being the composition $(90-x)SiO_2$—$xNb_2O_5$—$10La_2O_3$ of the center portion of the medium as described in Table 5, which shows a relationship between the composition of metal oxide and the optical property. As shown in Table 5 and FIG. 3, $\Delta v_d$ becomes large in the negative direction as the addition of Nb is increased.

TABLE 5

| | Composition of metal oxide and optical properties | | | | |
|---|---|---|---|---|---|
| | G | | F | | Property |
| | Metal | Content | Metal | Content | $\Delta n_d$ | $\Delta v_d$ |
| Example 19 | La | 10 | Nb | 5 | −0.085 | 0.7 |

TABLE 5-continued

| Composition of metal oxide and optical properties | | | | | |
|---|---|---|---|---|---|
| G | | F | | Property | |
| Metal | Content | Metal | Content | $\Delta n_d$ | $\Delta v_d$ |
| La | 10 | Nb | 10 | −0.060 | −1.2 |
| La | 10 | Nb | 15 | −0.043 | −1.5 |
| La | 10 | Nb | 20 | −0.035 | −1.8 |

(Content is a metal oxide conversion ratio mol % of metal dopant f when the absolute amount of metal dopant g becomes maximum)

Therefore, it is found that the optical element obtained by having an even concentration distribution of metal group F is also excellent for chromatic aberration correction and thus the amount of chromatic aberration can be controlled by the amount of second metal dopant of metal group F.

EXAMPLE 20

Figure 4:
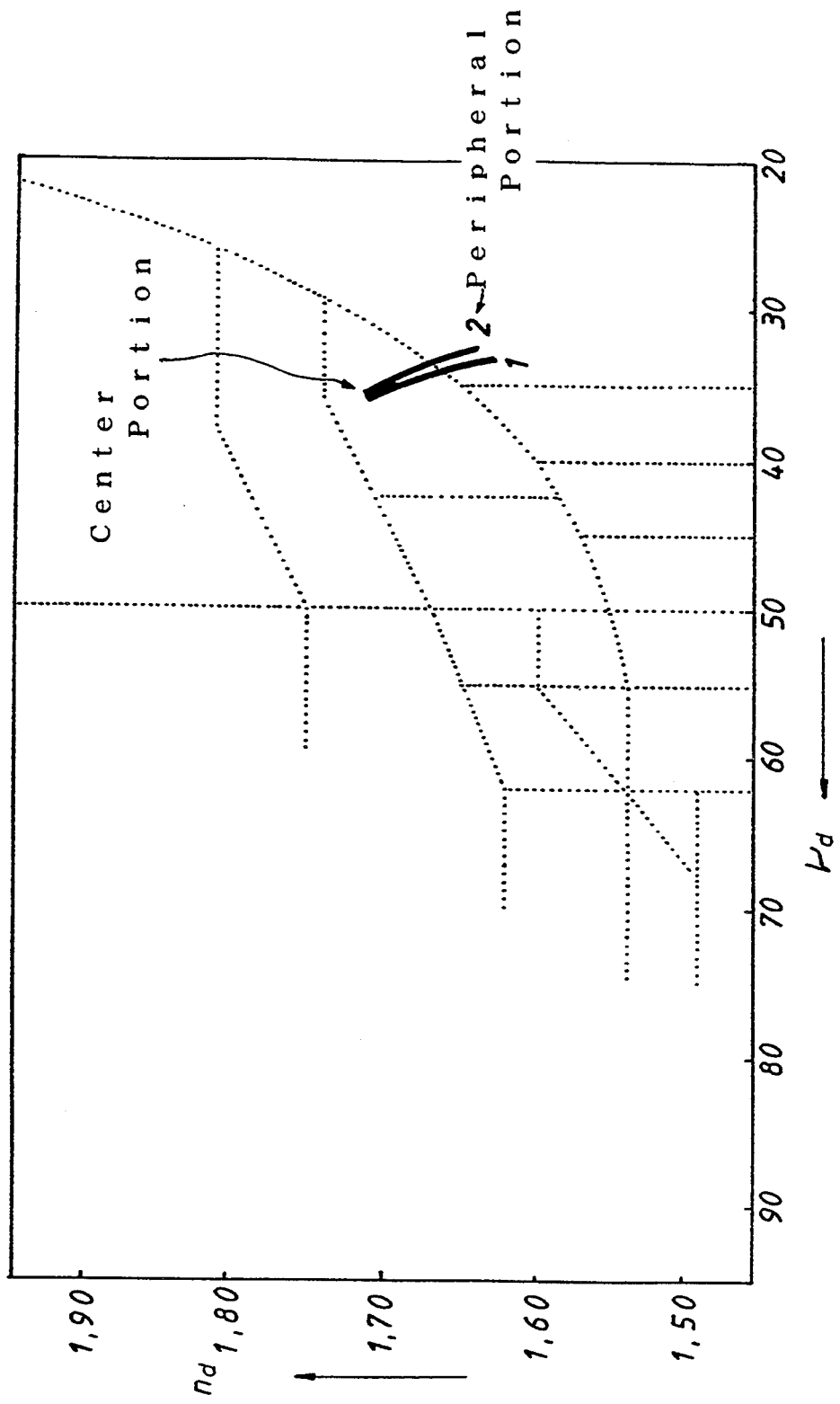
FIG. 4 is an explanatory view showing a relationship between the Abbe number and the refractive index of a gradient index optical element shown in example 20.

The above explanations illustrate the case in which the concentration of second metal dopant of metal group F is evenly distributed as an absolute value, but even when the concentration distribution is slightly deviated from an even distribution, the same effect as described above can be obtained. An example showing such an effect is shown in Table 6 which shows a relationship between the composition of metal oxide and the optical properties. In this example the composition of the center portion of the medium is $65SiO_2—15TiO_2—20Y_2O_3$ and the composition of the periphery portion of the medium is $65SiO_2—14TiO_2—0Y_2O_3$ and then $TiO_2$ is present with a small concentration gradient as an absolute amount. In FIG. 4, line 1 shows $n_d—v_d$ property at this time, and this is the same as the property (line 2 in FIG. 4) of the optical element in such a manner that the concentration distribution of $TiO_2$ is quite even. Therefore, it is found that the optical element having the concentration distribution of second metal dopant of metal group F being slightly deviated from an even distribution has a low amount of chromatic aberration and is excellent in chromatic aberration correction.

TABLE 6

| Composition of metal oxide and optical properties | | | | | |
|---|---|---|---|---|---|
| G | | F | | Property | |
| Metal | Content | Metal | Content | $\Delta n d$ | $\Delta vd$ |
| Center portion | Y | 20 | Ti | 15 | −0.085 | −2.5 |
| Peripheral portion | Y | 0 | Ti | 14 | −0.085 | −2.5 |

(Content is a metal oxide conversion ratio mol % of metal dopant f when the absolute amount of metal dopant g becomes maximum)

In the above described examples, the composition of the pheriphery portion of first metal dopant in metal group G is zero, but even when the composition of the periphery of first metal dopant in metal group G is not zero, the directions of the optical properties are not changed so that in the gradient index optical element the occurrence of chromatic aberration is suppressed. Moreover, when the present invention is applied to an axial gradient index optical element, high effect can be derived.

What is claimed is:

1. A gradient index optical element comprising: at least one first metal dopant selected from the group consisting of La, Zr, Sn, In, Y, Ge, Zn, Ba, Ca, As, Sr, Ga and Gd distributed in a glass medium with a concentration gradient, and at least one second metal dopant selected from the group consisting of Nb, Ta, Ti, Bi, Pb, Sb, Zr, Sn, In, Y and Tl, which is distributed equally in the glass medium so as to satisfy the following equation as an absolute amount $$|\Delta C_f / \Delta C_g| \cdot 100 \leqq 5$$

wherein $\Delta C_g$ is a difference between maximum value and minimum value of absolute value of metal oxides of the first metal doping and $\Delta C_f$ is a difference between maximum value and minimum value of absolute value of metal oxides of the second metal doping.

2. A gradient index optical element as claimed in claim 1, wherein at a position that the absolute amount of the first metal dopant in the optical element is maximum, the medium contains an overall conversion amount of the first metal dopant of 5~40 mol % and contains an overall conversion amount of the second metal dopant of 2~40 mol %.

3. A gradient index optical element as claimed in claim 1, wherein the first metal dopant is any one of Zr, Sn, In, Y, Ge, Zn and Ga, and the second metal dopant is any one of Nb, Ta, Ti, Bi, Pb, Sb, Zr and Tl.

4. A gradient index optical element as claimed in claim 1, wherein the second metal dopant is any one of Nb, Ta, Ti, Bi, Sb and Tl, and at a position where a content of the first metal dopant in the optical element is maximum, the absolute amount of the second metal dopant is 2 mol % or more.

5. A gradient index optical element as claimed in claim 1, wherein the second metal dopant is either Pb or Zr, and at a position that a content of the first metal dopant in the optical element is maximum, the absolute amount of the second metal dopant is 5 mol % or more.

6. A gradient index optical element as claimed in claim 1, wherein the second metal dopant is any one of Sr, In and Y, and at a position that a content of the first metal dopant in the optical element is maximum, the absolute amount of the second metal dopant is 10 mol % or more.

7. A gradient index optical element as claimed in claim 1, wherein the first metal dopant is any one of La, Ba, Ca, As, Sr and Gd, and the second metal dopant is any one of Nb, Ta, Ti, Bi, Sb and Tl, and at a position that a content of the first metal dopant in the optical element is maximum, the absolute amount of the second metal dopant is 2 mol % or more.

8. A gradient index optical element as claimed in claim 1, wherein the first metal dopant is either Y or Ge, and the second metal dopant is Bi, and at a position that a content of the first metal dopant in the optical element is maximum, the absolute amount of the second metal dopant is 2 mol % or more.

9. A gradient index optical element as claimed in claim 1, wherein the first metal dopant is any one of Sn, In, Y, Ge, Zn and Ga, and the second metal dopant is Tl, and at a position that a content of the first metal dopant in the optical element is maximum, the absolute amount of the second metal dopant is 2 mol % or more.

10. A gradient index optical element as claimed in claim 1, wherein the first metal dopant is any one of In, Y, Ge and Ga, and the second metal dopant is any one of Nb, Ta, Ti and Sb, and at a position that content of the first metal dopant in the optical element is maximum, the absolute amount of the second metal dopant is 5 mol % or more.

11. A gradient index optical element as claimed in claim 1, wherein the first metal dopant is any one of La, Y, Ba, Ca, As, Sr and Gd, and the second metal dopant is Pb, and at a position that a content of the first metal dopant in the optical element is maximum, the absolute amount of the second metal dopant is 5 mol % or more.

12. A gradient index optical element as claimed in claim 1, wherein the first metal dopant is any one of Sn, In, Zn and Ga, and the second metal dopant is Bi, and at a position that a content of the first metal dopant in the optical element is maximum, the absolute amount of the second metal dopant is 5 mol % or more.

13. A gradient index optical element as claimed in claim 1, wherein the first metal dopant is Zr, and the second metal dopant is Tl, and at a position that a content of the first metal dopant in the optical element is maximum, the absolute amount of the second metal dopant is 5 mol % or more.

14. A gradient index optical element as claimed in claim 1, wherein the first metal dopant is either Ba or Gd, and the second metal dopant is Zr, and at a position that a content of the first metal dopant in the optical element is maximum, the absolute amount of the second metal dopant is 5 mol % or more.

15. A gradient index optical element as claimed in claim 1, wherein the first metal dopant is either Sn or Zn, and the second metal dopant is any one of Nb, Ti and Sb, and at a position that a content of the first metal dopant in the optical element is maximum, the absolute amount of the second metal dopant is 10 mol % or more.

16. A gradient index optical element as claimed in claim 1, wherein the first metal dopant is Zr, and the second metal dopant is Bi, and at a position that a content of the first metal dopant in the optical element is maximum, the absolute amount of the second metal dopant is 10 mol % or more.

17. A gradient index optical element as claimed in claim 1, wherein the first metal dopant is any one of In, Ge, Zn and Ga, and the second metal dopant is Pb, and at a position that a content of the first metal dopant in the optical element is maximum, the absolute amount of the second metal dopant is 10 mol % or more.

18. A gradient index optical element as claimed in claim 1, wherein the first metal dopant is any one of Ca, As and Sr, and the second metal dopant is Zr, and at a position that a content of the first metal dopant in the optical element is maximum, the absolute amount of the second metal dopant is 10 mol % or more.

19. A gradient index optical element as claimed in claim 1, wherein the first metal dopant is either Sr or Gd, and the second metal dopant is Sn, and at a position that a content of the first metal dopant in the optical element is maximum, the absolute amount of the second metal dopant is 10 mol % or more.

20. A gradient index optical element as claimed in claim 1, wherein the first metal dopant is any one of Ba, Sr, As and Gd, and the second metal dopant is any one of In and Y, and at a position that a content of the first metal dopant in the optical element is maximum, the absolute amount of the second metal dopant is 10 mol % or more.

21. A gradient index optical element as claimed in claim 1, wherein the first metal dopant is Zr, and the second metal dopant is any one of Nb, Sb and Ti, and at a position that a content of the first metal dopant in the optical element is maximum, the absolute amount of the second metal dopant is 15 mol % or more.

22. A gradient index optical element as claimed in claim 1, wherein the first metal dopant is La, and the second metal dopant is either Zr or In, and at a position that a content of the first metal dopant in the optical element is maximum, the absolute amount of the second metal dopant is 15 mol % or more.

23. A gradient index optical element as claimed in claim 1, wherein the first metal dopant is any one of La, Ba, Ca, and As, and the second metal dopant is Sn, and at a position that a content of the first metal dopant in the optical element is maximum, the absolute amount of the second metal dopant is 15 mol % or more.

24. A gradient index optical element as claimed in claim 1, wherein the first metal dopant is Sn, and the second metal dopant is either Ta or Pb, and at a position that a content of the first metal dopant in the optical element is maximum, the absolute amount of the second metal dopant is 15 mol % or more.

25. A gradient index optical element as claimed in claim 1, wherein the first metal dopant is distributed at an inner portion of the optical element in such a manner that the absolute amount of the first metal dopant is maximum at a center portion of the optical element, and is minimum at a portion near a surface of the optical element.

26. A gradient index optical element as claimed in claim 1, wherein the amount of the first metal dopant is distributed in such a manner that the absolute amount of the first metal dopant is decreased in a parabolic shape in a direction of a portion near a surface of the optical element.

27. A gradient index optical element as claimed in claim 1, wherein the first metal dopant is distributed at an inner portion of the optical element in such a manner that the absolute amount of the first metal dopant is minimum at a center portion of the optical element, and the absolute amount of the first metal dopant is maximum at a portion near a surface of the optical element.

28. A gradient index optical element as claimed in claim 1, wherein the amount of the first metal dopant is distributed in such a manner that the absolute value of the first metal dopant is increased in a parabolic shape in a direction of a portion near a surface of the optical element.

29. A gradient index optical element as claimed in claim 1, wherein the optical element contains a plurality of metal dopants selected from the first metal dopants.

30. A gradient index optical element as claimed in claim 1, wherein the optical element contains a plurality of metal dopants selected from the second metal dopants.

31. A gradient index optical element, comprising: a glass substrate having a first metal dopant distributed with a concentration gradient in the glass substrate and a second metal dopant distributed uniformly in the glass substrate, the first metal dopant being effective to impart a gradient refractive index to the optical element and the second metal dopant being effective to decrease a chromatic aberration of the optical element, and wherein the first metal dopant comprises at least one metal selected from the group consisting of La, Zr, Sn, In, Y, Ge, Zn, Ba, Ca, As, Sr, Ga and Gd, and the second metal dopant comprises at least one metal selected from the group consisting of Nb, Ta, Ti, Bi, Pb, Sb, Zr, Sn, In, Y and Tl.

32. A gradient index optical element according to claim 31; wherein first and the second metal dopants are distributed in the glass substrate so that $|\Delta C_f/\Delta C_g| \cdot 100 \leq 5$, wherein $\Delta C_g$ is a difference between an absolute maximum value and an absolute minimum value of metal oxides of the first metal dopant and $\Delta C_f$ is a difference between an absolute maximum value and an absolute minimum value of metal oxides of the second metal dopant.

33. A gradient index optical element according to claim 32; wherein the concentration gradient of the first metal dopant has a greatest absolute value at a center portion of the optical element and decreases parabolically to a periphery portion of the optical element.

34. A gradient index optical element according to claim 32; wherein the concentration gradient of the first metal dopant has a smallest absolute value at a center portion of the optical element and increases parabolically to a periphery portion of the optical element.

35. A gradient index optical element, comprising: a glass substrate having a first metal dopant distributed with a concentration gradient in the glass substrate and a second metal dopant distributed uniformly in the glass substrate, the first metal dopant being effective to impart a gradient refractive index to the optical element and the second metal dopant being effective to decrease a chromatic aberration of the optical element, and wherein the first and the second metal dopants are distributed in the glass substrate so that $|\Delta C_f/\Delta C_g| \cdot 100 \leq 5$, wherein $\Delta C_g$ is a difference between an absolute maximum value and an absolute minimum value of metal oxides of the first metal dopant and $-\Delta C_f$ is a difference between an absolute maximum value and an absolute minimum value of metal oxides of the second metal dopant.

36. A gradient index optical element according to claim 35; wherein the concentration gradient of the first metal dopant has a greatest absolute value at a center portion of the optical element and decreases parabolically to a periphery portion of the optical element.

37. A gradient index optical element according to claim 35; wherein the concentration gradient of the first metal dopant has a smallest absolute value at a center portion of the optical element and increases parabolically to a periphery portion of the optical element.

* * * * *